No. 637,639. Patented Nov. 21, 1899.
G. MISCHLER.
HARVESTER CUTTING APPARATUS.
(Application filed July 24, 1899.)
(No Model.) 2 Sheets—Sheet 1.
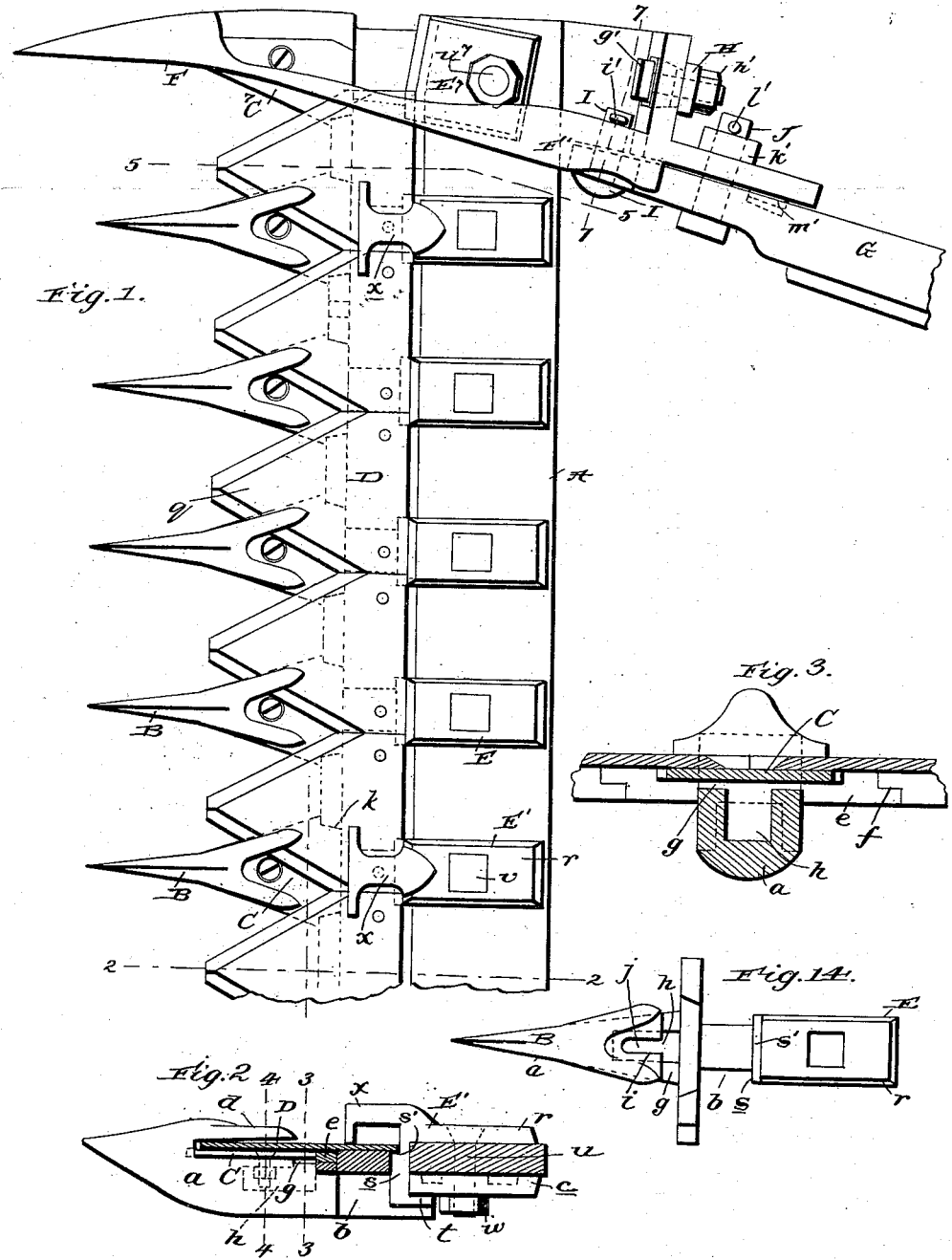

No. 637,639. Patented Nov. 21, 1899.
G. MISCHLER.
HARVESTER CUTTING APPARATUS.
(Application filed July 24, 1899.)
(No Model.) 2 Sheets—Sheet 2.
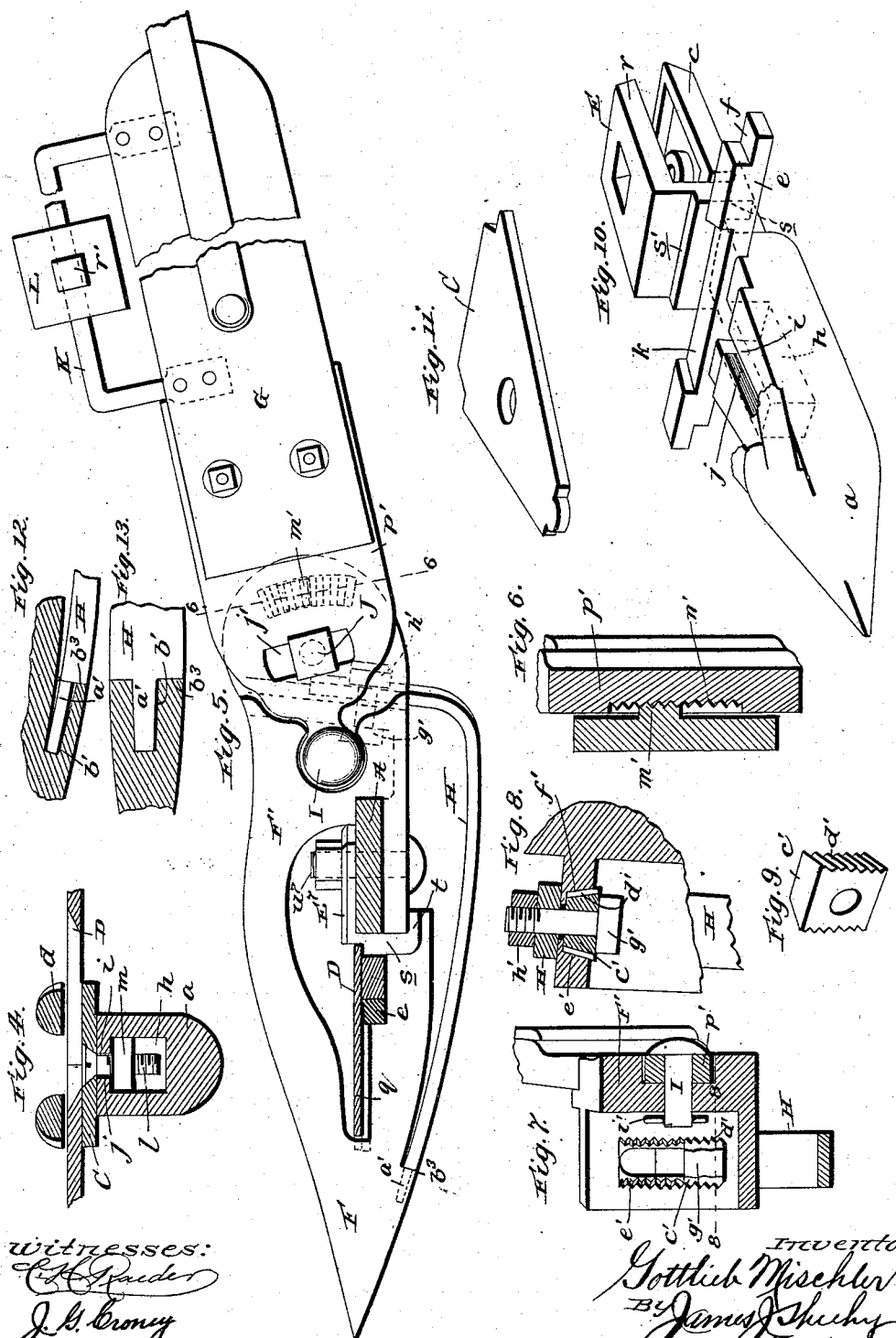

UNITED STATES PATENT OFFICE.

GOTTLIEB MISCHLER, OF DES MOINES, IOWA.

HARVESTER CUTTING APPARATUS.

SPECIFICATION forming part of Letters Patent No. 637,639, dated November 21, 1899.

Application filed July 24, 1899. Serial No. 724,962. (No model.)

*To all whom it may concern:*

Be it known that I, GOTTLIEB MISCHLER, a citizen of the United States, residing at Des Moines, in the county of Polk and State of Iowa, have invented new and useful Improvements in Harvester Cutting Apparatus, of which the following is a specification.

My invention relates to harvester cutting apparatus; and it consists in the simple, durable, highly-efficient, and otherwise advantageous construction hereinafter described, and particularly pointed out in the claims appended.

In the accompanying drawings, Figure 1 is a broken plan view of the outer portion of my improved apparatus. Fig. 2 is a transverse section taken in the plane indicated by the broken line 2 2 of Fig. 1 and illustrating one of my improved sickle-guards in side elevation. Fig. 3 is a detail section taken on line 3 3 of Fig. 2 and illustrating the lapped joints of the lateral spurs of the guards. Fig. 4 is an enlarged detail section taken in the plane of line 4 4 of Fig. 2. Fig. 5 is an enlarged transverse section taken in the plane indicated by line 5 5 of Fig. 1. Fig. 6 is a transverse section taken in the plane indicated by line 6 6 of Fig. 5. Fig. 7 is an enlarged detail section taken in the plane of line 7 7 of Fig. 1. Fig. 8 is a detail section taken on line 8 8 of Fig. 7. Fig. 9 is a perspective view of the adjustable block employed in the connection between the end shoe and the runner thereof. Fig. 10 is an enlarged broken perspective view illustrating one of the sickle-guards and the clip for strengthening the connection of the same to the finger-bar. Fig. 11 is a perspective view of one of the ledger-plates. Figs. 12 and 13 are enlarged detail sections taken at right angles to each other and illustrating the connection between the forward end of the runner on the end shoe and said shoe. Fig. 14 is a plan view, on a reduced scale, illustrating one of the fingers or sickle-guards and the clip for strengthening the connection of the same to the finger-bar.

In the said drawings similar letters designate corresponding parts in all of the several views, referring to which—

A is the finger-bar, and B B the fingers or sickle-guards, of my improved apparatus. The guards are similar in construction, and therefore a description of the one shown in detail will suffice to impart an understanding of all. Said guard is cast in one piece and comprises a body $a$, neck $b$, and flat head $c$. The body is made long and narrow in order to reduce friction and prevent clogging of grain on the guard-point, and the under side of its fore part is shaped like a sled-runner, so as to admit of the cutter-bar being tilted down to a considerable extent without liability of the point of the guard running into the ground. At its upper side the said guard-body is provided with a rearwardly-extending overhanging portion $d$, which is bifurcated, as shown, for a purpose presently described. It is also provided at its rear end with lateral spurs $e$, which have their ends rabbeted, as indicated by $f$. By virtue of this when the several guards are assembled the ends of the spurs thereof may be lapped, as shown in Fig. 3. This lapping of the spurs is advantageous because it assists in holding the guards in proper position with respect to each other and prevents grass getting between them and clogging the sickle, and also because it enables the spurs to form a smooth guide for the front of the bar of the sickle presently to be described.

Immediately in front of the spurs $e$ the guard-body $a$ is provided with a shallow transverse groove $g$. This groove communicates with a longitudinal central and comparatively deep depression $h$, the forward portion of which is coincident with the bifurcation of the overhanging portion $d$ and is covered by a wall $i$, having a longitudinal slot $j$.

C is the ledger-plate of the guard, which is made of hardened steel in the shape best shown in Fig. 11. This plate is arranged on the guard-body below the overhanging portion $d$ thereof, and its rear end is seated in a depression $k$ at the rear of the body, so as to hold it against turning. Said plate is connected to the guard-body through the medium of a bolt $l$ and nut $m$, as best shown in Fig. 4. This manner of connecting the ledger-plate to the guard-body is advantageous because the connection may be quickly and easily effected with a common screw-driver, and when desired the ledger-plate may be as readily disconnected and removed.

In applying the ledger-plate the bolt $l$ is passed through the aperture of the plate and equipped with the nut $m$, after which the plate is held in a position at right angles to its operative position and is passed between the overhanging portion $d$ and the main portion of the guard-body, the nut $m$ being pushed along the groove $g$ until it drops into the comparatively deep depression $h$. The plate is then moved forward to carry the bolt $l$ into the slot $j$ in wall $i$ and the nut $m$ into a position below said wall and is turned and pressed down into its proper operative position. (Shown in Fig. 2.) The bolt is then turned through the medium of a screw-driver passed through the overhanging portion $d$ of the guard-body until the connection is sufficiently tight. To disconnect and remove the ledger-plate, the operation described is reversed.

The nut $m$ is preferably square and of such size that it is held against turning in the depression $h$, and the head of the bolt $l$ is preferably countersunk in the ledger-plate, as shown, so as not to offer any obstruction to the sickle-bar in its movements. When desired, the lower end of the bolt may be upset to a slight extent in order to prevent the nut dropping off the same when the ledger-plate is removed from the guard.

The manner described of connecting the ledger-plate to the guard-body admits of the plate being made of hardened steel, no hammering, which entails the use of a soft-metal plate, being necessary.

D is a sickle which comprises the usual bar $p$ and shears $q$, and E E' are clips which assist in the connection of the sickle-guards to the finger-bar and hold said guards against lateral movement. The clips E E' respectively comprise a body-plate $r$, which is adapted to be arranged upon the finger-bar, and arms $s$, which depend from the forward portion of the body-plate at opposite sides of the neck $b$ of a guard, so as to hold said guard against lateral movement, and terminate in rearwardly-extending fingers $t$, calculated to hold the head $c$ of the guard against the under side of the finger-bar. The arms $s$ also form shoulders $s'$ for the sickle D, as best shown in Fig. 2. This will be appreciated as an important advantage when it is remembered that the clips or combined clips and shoulders can be replaced at a small cost when worn out. It will also be appreciated that my improvement is vastly superior to the ordinary construction, in which the sickle-shoulder is formed integral with the guard, and as soon as said shoulder is worn out the guard must be replaced by a new one.

Both the head $c$ of the guard and the body-plate $r$ of the clip are connected to the finger-bar by a bolt $u$, which has an angular head $v$ countersunk in the clip-plate and is equipped with a nut $w$, the latter being arranged in rear of the body of the guard, as shown, so that no grass or grain can lodge upon the same and impede the movement of the sickle and the forward movement of the cutting apparatus.

In addition to the elements above enumerated the clips E', which are preferably employed in conjunction with every fourth or fifth guard of the apparatus, are provided with forwardly and downwardly extending arms $x$, the purpose of which is to hold the sickle D down to its work in the guards.

F is the outer end shoe of the apparatus, which is cast in one piece and provided with a ledger-plate $C^7$, which differs in shape from those of the guards B. Said end shoe is connected to the finger-bar A by a large clip $E^7$ and bolt $u^7$, and its point is turned slightly inward or toward the guards, this being advantageous because it makes the distance between the center of the end shoe and the adjacent guard B the same as the distance between the several guards B, which arrangement allows the mower or reaper to turn corners without stopping, since the amount of grass taken between the end shoe and the adjacent guard is no greater than the amount taken between the guards and can be easily taken care of by the sickle. The inward disposition of the point of the end shoe renders the apparatus superior to the ordinary apparatus, in which, by reason of the point of the shoe being outwardly disposed, more grass is taken between the end shoe and the outer guard than the sickle is capable of cutting, with the result that the machine is checked or stopped. The shoe, like the guards, is made long and narrow, so as to operate with a minimum amount of friction, and its heel $F'$ is shaped and carried upwardly and inwardly in a laterally-oblique direction, so as to enable it to force the grass as cut away from the uncut grass and cause the cut grass to fall against the grass-board G, (presently described,) which is calculated to throw said cut grass about a foot and a half away from the uncut grass and out of the path of the mower-wheels on the succeeding round, thus insuring the wheels taking a firm hold on the sod and preventing stoppage of the wheels and the consequent choking and clogging of the sickle.

H is the iron runner of the shoe F. This runner has its forward end reduced, as indicated by $a'$, and loosely placed in a socket $b'$, extending forwardly from a shoulder $b^3$ at the under fore part of the shoe. Its rear portion is carried upwardly at the rear of the shoe and is adjustably connected thereto through the medium of the means shown in Figs. 7, 8, and 9. Such means embrace a block $c'$, which has tapered and serrated sides $d'$ and is arranged in a slot $e'$ in the shoe F, so as to engage the beveled and serrated walls $f'$ of said slot, a headed bolt $g'$, which extends through the block $c'$ and the upwardly-disposed rear portion of the runner H, and a nut $h'$, mounted on the bolt. By loosening the nut $h'$ sufficient to disengage the serrations of the block $c'$ from those of the end shoe the runner H is released and may then be adjusted to raise or lower the outer end of the cutting apparatus to the extent necessary to keep the sickle from binding on the guards and relieve the strain on the finger-bar and apparatus. When the runner is properly adjusted, it may be readily fixed with respect to the end shoe by turning the nut $h'$ upon the bolt $g'$, so as to draw the serrations of the block $c'$ into engagement with the serrations on the walls of the slot $e'$.

As best shown in Figs. 1 and 5 of the drawings, the grass-board G is connected to the heel F' of the end shoe F by two bolts, (lettered I and J, respectively.) The bolt I, which effects a pivotal connection of the grass-board to the end shoe, is secured against casual displacement by a splint or key $i'$, while the bolt J, which extends through a slot $j'$ in the grass-board and adjustably fixes said board with respect to the shoe, is secured against casual displacement by a nut $k'$ and a splint or key $l'$.

For the purpose of assisting the bolt J and nut $k'$ in holding the grass-board against casual movement with respect to the end shoe, the shoe is provided with a serrated projection $m'$, arranged to engage an arcuate series of serrations $n'$ on the plate $p'$ at the inner end of the grain-board. The said intermeshed serrations $m'$ $n'$ preclude casual movement of the grain-board, but when the nut on bolt J is loosened said board may be raised or lowered to a considerable extent.

Connected to and disposed above the grain-board G is a metallic frame K, on which is secured by a binding-screw $r'$ a counterpoise L. The said counterpoise has for its purpose to overcome the weight of grass or other material imposed on the guards and end shoe in practice and thereby prevent depression of the guard-points, which tends to twist the cutter-bar and apparatus out of alinement and causes the sickle to strike the overhanging portions of the guards and spring away from the ledger-plates. It will be appreciated from this that the counterpoise L increases the cutting capacity of the apparatus.

Notwithstanding the many material advantages which it possesses it will be observed that my improved apparatus is much more simple than existing constructions and is susceptible of being made and sold with profit quite as cheaply as said constructions.

Having thus described my invention, what I claim is—

1. In a sickle-guard, the combination with a body having an overhanging portion bifurcated at its rear end, and also having a depression and a slot disposed above and communicating with the depression; of a ledger-plate arranged between the overhanging and main portions of the body and provided with an aperture, a threaded bolt passed through the aperture of the plate and the slot of the body, and a nut mounted on said bolt and arranged in the depression of the body, substantially as specified.

2. In a sickle-guard, the combination with a body having an overhanging, bifurcated portion and also having a transverse groove in its upper side, a longitudinal central depression communicating at one end with said groove, and a longitudinal slot disposed above and communicating with the depression and open at its rear end; of a ledger-plate arranged between the overhanging and main portions of the body and provided with an aperture, a threaded bolt passed through the aperture of the plate and the slot of the body, and a nut mounted on said bolt and arranged in the depression of the body, substantially as specified.

3. In a cutting apparatus, the combination of a finger-bar, and sickle-guards connected thereto and having lateral spurs overlapping each other, substantially as specified.

4. In a cutting apparatus, the combination of a finger-bar, and sickle-guards connected thereto and having lateral spurs the contiguous ends of which are rabbeted and lapped, substantially as specified.

5. In a cutting apparatus, the combination of a finger-bar, a sickle-guard having a portion disposed below the finger-bar, a clip comprising a body-plate disposed upon the finger-bar, and arms depending from said body-plate at opposite sides of the guard and terminating in rearwardly-extending portions disposed below the portion of the guard below the finger-bar, and a connecting-bolt extending through the clip, finger-bar and guard, substantially as specified.

6. In a cutting apparatus, the combination of a finger-bar, a sickle-guard having a portion disposed below the finger-bar, a clip comprising a body-plate arranged upon the finger-bar, an arm extending forwardly and downwardly from said body-plate and adapted to hold a sickle down to its work, and arms depending from said body-plate at opposite sides of the guards and terminating in rearwardly-extending portions disposed below the portion of the guard below the finger-bar, and a connecting-bolt extending through the clip, finger-bar and guard, substantially as specified.

7. In a cutting apparatus, the combination of a finger-bar, sickle-guards having lateral spurs overlapping each other, and also having portions disposed below the finger-bar, a sickle, clips comprising body-plates arranged upon the finger-bar, and arms depending from said plates and terminating in rearwardly-extending fingers arranged below the portions of the guards below the finger-bar, and connecting-bolts extending through the clips, finger-bar and guards, substantially as specified.

8. In a cutting apparatus, the combination of a finger-bar, sickle-guards, a sickle, clips engaging the guards and having shoulders forming bearings for the sickle, and means detachably connecting the clips, finger-bar and guards, substantially as specified.

9. In a cutting apparatus, the combination of a finger-bar, sickle-guards having portions arranged below the finger-bar and also having lateral spurs, the contiguous ends of which are rabbeted and lapped, a sickle, clips having portions arranged upon the finger-bar and also having shoulders $s'$ and depending arms disposed at opposite sides of the guards, and means detachably connecting the clips, finger-bar and guards, substantially as specified.

10. In a cutting apparatus, the combination of a finger-bar, sickle-guards, a sickle, clips having depending arms resting at opposite sides of the guards and also having shoulders forming bearings for the sickle, and means detachably connecting the clips, finger-bar and guards, substantially as specified.

11. In a cutting apparatus, the combination of a finger-bar, sickle - guards connected thereto, a sickle, a shoe connected to the outer end of the finger-bar and having a slot the side walls of which are beveled and serrated, a block removably arranged in said slot and having opposite beveled and serrated sides, a runner having its forward end arranged to loosely engage the shoe and also having an upwardly-extending arm, and a connecting-bolt extending through the arm of the runner and the block, substantially as specified.

12. In a cutting apparatus, the combination of a finger - bar, sickle - guards connected thereto, a sickle, a shoe connected to the outer end of the finger-bar, a grass-board adjustably connected to the end shoe and having a frame, and a counterpoise adjustably fixed on said frame, substantially as specified.

In testimony whereof I have hereunto set my hand in presence of two subscribing witnesses.

GOTTLIEB MISCHLER.

Witnesses:
H. A. KROEGER,
S. G. VAN AUKEN.